United States Patent [19]

Badesha et al.

[11] Patent Number: 4,576,634

[45] Date of Patent: Mar. 18, 1986

[54] PROCESS FOR THE PREPARATION OF CHALCOGENIDE ALLOYS

[75] Inventors: Santokh S. Badesha, Pittsford; Damodar M. Pai, Fairport; Kathleen M. Carmichael, Williamson; Ihor W. Tarnawskyj, Rochester, all of N.Y.

[73] Assignee: Xerox Corporation, Stamford, Conn.

[21] Appl. No.: 765,758

[22] Filed: Aug. 15, 1985

[51] Int. Cl.$^4$ .............................................. C01B 19/00
[52] U.S. Cl. .................................. 75/0.5 A; 420/579; 420/590; 423/508; 423/509; 423/510
[58] Field of Search .............. 75/0.5 A; 420/579, 590; 423/508, 509, 510

[56] References Cited

U.S. PATENT DOCUMENTS

| | | | |
|---|---|---|---|
| 2,835,558 | 5/1958 | Vaaler | 23/209 |
| 2,860,954 | 11/1958 | Bueker et al. | 423/510 |
| 3,390,090 | 6/1968 | Taylor et al. | 423/508 |
| 3,540,859 | 11/1970 | Taylor et al. | 423/508 |
| 3,542,526 | 11/1970 | Peterson | 423/508 |
| 3,954,951 | 5/1976 | Buckley | 423/510 |
| 4,007,255 | 2/1977 | Buckley | 423/510 |
| 4,009,249 | 2/1977 | Buckley | 423/510 |
| 4,411,698 | 10/1983 | Badesha | 75/121 |
| 4,460,408 | 7/1985 | Badesha et al. | 75/0.5 R |
| 4,484,945 | 11/1984 | Badesha et al. | 75/0.5 A |

*Primary Examiner*—Wayland Stallard
*Attorney, Agent, or Firm*—E. O. Palazzo

[57] ABSTRACT

Disclosed is a process for the preparation of high purity chalcogenide alloys which comprises providing an acid mixture of the chalcogens; forming a solution thereof; and thereafter reacting the solution with a reducing agent.

30 Claims, No Drawings

PROCESS FOR THE PREPARATION OF CHALCOGENIDE ALLOYS

BACKGROUND OF THE INVENTION

This invention is generally directed to improved processes for obtaining chalcogenide alloys; and more specifically, the present invention is directed to a substantially pollution free process for obtaining high purity selenium alloys by the solution coreduction of the corresponding respective acids thereof. In accordance with the simple, direct, economically attractive process of the present invention, there is generated, in a purity of 99.99 percent, alloys of selenium, inclusive of selenium arsenic alloys with small particle sizes. High purity alloys prepared in accordance with the process of the present invention are particularly useful as photoconductive members in xerographic imaging processes. Also, the process of the present invention enables alloy products of a small particle size diameter, less than for example one micron, permitting their rapid dispersion in polymeric binder compositions.

The art of xerography as presently practiced requires the formation of an electrostatic latent image on a photoconductive member. Materials commonly selected for the photoconductive member are amorphous selenium, amorphous selenium alloys, halogen doped amorphous selenium substances, and halogen doped amorphous selenium alloys. These photoconductive substances must usually have a purity of 99.99 percent or greater since the presence of contaminants has a tendency to adversely effect the electrical properties thereof resulting in relatively poor copy quality. Numerous complex physical and chemical processes are known for obtaining the aforementioned photoconductive substances. Flexible photoreceptor devices with photoconductive substances, such as selenium, prepared in accordance with these processes have a tendency to deteriorate over a period of time; therefore, the costly selenium or selenium alloy used must be recovered and recycled. Various methods are available for recovering selenium and its alloys from the substrate on which it is deposited including heat stripping, water quenching, ultrasonics, and bead blasting.

Many of the prior art processes, including the chemical processes for obtaining high purity materials of selenium and selenium alloys from contaminated source materials with these substances, involve a number of method steps, and undesirably high temperature distillations. Additionally, in many of these processes the recycling of reactants is not achieved. Further, in most instances, the prior art processes for recovering selenium, selenium alloys, or other metallic elements from contaminated source materials is complex, economically unattractive, and causes environmental contamination in that, for example, vaporous oxides are formed and must be eliminated. Also, many of these processes result, for example, in the recovery of selenium or selenium alloys, which nevertheless contain impurities that can, over an extended period of time, adversely effect their photoconductivity.

There is, for example, described in U.S. Pat. No. 4,047,973 a physical method for recovering selenium, or an alloy thereof from the surface of an endless xerographic belt with a metal substrate having deposited thereon a thin layer of an organic resinous material which is overcoated with a relatively thicker layer of selenium or a selenium alloy by subjecting the surface of the belt to jets of high water pressure for the purpose of stripping the selenium or selenium alloy without substantially effecting the layer of organic resinous material. According to the disclosure of this patent, subsequent to removal of the water from the slurry, there is obtained substantially pure selenium or an alloy thereof.

Also, in U.S. Pat. No. 4,009,249 there is disclosed a process for precipitating stable red amorphous selenium, which may include halogen with hydrazine from a solution of selenious acid in methanol or ethanol. The process is accomplished at a temperature of between about $-20°$ C. and the freezing point of the solution selected. The resulting precipitate is maintained at a temperature of about $-13°$ C. to about $-3°$ C. until a red color appears. A similar teaching is presented in U.S. Pat. No. 4,007,255 with the exception that there is disclosed a process for producing a stable red amorphous selenium thallium material. There is reference in both of these patents to processes for precipitating selenium by reducing selenious acid in an aqueous solution with sulfur dioxide or sulfurous acid as described in British Pat. No. 515,676, and U.S. Pats. Nos. 2,186,085 and 3,130,012. Further, it is indicated in these patents that a process for precipitating selenium from an aqueous solution of selenious acid with sulfur dioxde, hydroxylamine hydrochloride, or hydrazine sulfate at $6°$ to $45°$ C. is described in U.S. Pat. No. 2,860,954.

Moreover, there is described in U.S. Pat. No. 4,411,698, the disclosure of which is incorporated herein by reference, an improved process for obtaining in high purity photoconductive compositions of selenium, tellurium, and arsenic, which comprises converting a source material into a mixture of corresponding oxides, converting the oxides to pure esters, and subsequently affecting reduction of the esters. More specifically, there is described in this patent an improved process for reclaiming or recovering selenium, tellurium, or arsenic in high purity, 99.99 percent, which comprises providing a source material such as a scrap alloy with these elements and other substances; converting this material into a mixture of the corresponding oxides of the elements; reacting the resulting oxides with an alcohol or a diol followed by separation of the esters from the reaction mixture; and subjecting, subsequent to purification by distillation or recrystallization, the esters to a coreduction reaction. The invention of the present application is directed to a similar process with the important exception that the formation of the esters is eliminated.

Moreover, illustrated in a copending application U.S. Ser. No. 594,626, entitled Process For Reclamation of High Purity Selenium From Scrap Alloys, the disclosure of this application being totally incorporated herein by reference, is an improved process for attaining high purity selenium, which comprises converting a source material into a solution mixture of the corresponding oxides, and subsequently adding a reducing composition thereto. More specifically, there is disclosed in the copending application an improved process for reclaiming or recovering selenium in high purity, 99.99 percent, which comprised providing a scrap selenium alloy; converting this alloy into a mixture of the corresponding oxides of the elements; separating the resulting selenium oxides by selective alcoholic dissolution; followed by subjecting the solution mixture of selenium oxides to a reduction reaction; and thereafter separating the selenium product from the solution. In one specific illustrative embodiment, there is disclosed in the copending application a process which comprised converting a scrap alloy with selenium to a mixture of corresponding oxides, followed by treating the mixture with an alcohol for the primary purpose of dissolving the selenium oxide formed. Subsequently, the resulting solution is treated with a reducing substance, and a selenium precipitated product is obtained in solution. Also, disclosed in U.S. Pat. No. 4,484,945, the disclosure of which is totally incorporated herein by reference, is a solution reduction process for the preparation of selenium alloys. In this process, there is initially provided a mixture of selenium alloys, followed by converting this mixture to oxides, and subsequently subjecting the oxide mixture to a reduction reaction. More specifically, there is disclosed in this patent a process for the preparation of chalogenide alloys in high purity which comprises providing a solution mixture of oxides of the desired chalcogens, and subsequently subjecting this mixture to a simultaneous coreduction reaction.

Accordingly, there continues to be a need for improved processes for obtaining chalcogenide alloys, inclusive of selenium, arsenic, and tellurium alloys, by a solution reduction procedure. Additionally, there continues to exist a need for an improved simple low temperature chemical process for obtaining selenium alloys, inclusive of selenium tellurium in high purities from the corresponding acids. There also continues to be a need for improved processes for obtaining selenium alloys in high purity, which processes involve a minimum number of operations, and do not require high temperature distillations. Furthermore, there continues to be a need for improved pollution free processes for obtaining selenium alloys in high purity. Also, there continues to be a need for improved processes for obtaining in high purity selenium alloys useful as photoconductive elements by the solution reduction of the appropriate acids of selenium, and other metallic elements. Furthermore, there is a need for processes for generating selenium alloys of a particle diameter of less than about 10 microns by the solution reduction of specific metallic acids.

Moreover, while numerous processes are known for the preparation and purification of selenium alloys, there continues to be a need for improved processes that permit the production of high purity selenium alloys at low temperatures. Further, there is a need for improved processes for obtaining selenium tellurium alloy photoconductive substances and selenium arsenic by subjecting to a reduction reaction a solution containing therein the acids of selenium and tellurium, or selenium and arsenic.

SUMMARY OF THE INVENTION

It is an object of the present invention to provide processes for obtaining photoconductive alloy substances from the appropriate metallic acids.

In another object of the present invention there is provided an improved process for obtaining selenium alloys from mixtures of the acids of selenium and other metallic substances.

A further object of the present invention is the provision of improved processes for generating selenium tellurium alloys from the solution reduction of acid mixtures of selenium and tullurium.

Also, in a further object of the present invention there is provided improved processes for generating selenium antimony alloys by the solution reduction of mixtures of selenium and antimony acids.

An additional object of the present invention is the provision of improved processes for generating selenium bismuth alloys by the solution reduction of acid mixtures of selenium and bismuth.

In still another object of the present invention there are provided selenium alloys in a powder form of a particle diameter of less than 10 microns.

Additionally, another object of the present invention resides in a process for generating tellurium arsenic alloys; tellurium bismuth alloys; and tellurium antimony alloys by the solution reduction of corresponding acid mixtures thereof.

Furthermore, in still another object of the present invention there are provided processes for the preparation of selenium alloys in a crystalline form by the solution reduction of appropriate acid mixtures.

These and other objects of the present invention are accomplsihed by the provision of an improved process for obtaining high purity photoconductive compositions, including selenium alloys, which comprises providing a source material; converting the source material into a solution mixture; and subsequently adding a reducing composition thereto. More specifically, the present invention is directed to an improved process for permitting the preparation of selenium alloys in high purity, that is 99.99 percent in some instances; and of particle diameters of less than about 10 microns, which comprises providing a solution mixture of the acids of selenium and other appropriate metallic substances; followed by subjecting the mixture of the acids to a reduction reaction; and thereafter separating the selenium alloy product therefrom.

In one specific illustrative embodiment, the process of the present invention comprises generating a specific alloy by providing a mixture of the corresponding selenium and arsenic acids; followed by dissolution of the mixture with an alcohol or glycol; and thereafter subjecting the resulting solution to a reduction, wherein a precipitated selenium arsenic alloy product is obtained.

DESCRIPTION OF PREFERRED EMBODIMENTS

The following specific preferred embodiments for the process of the present invention will now be provided, however, it is not desired to be limited to the process parameters disclosed. Also, in U.S. Pat. No. 4,411,698, the disclosure of which is totally incorporated herein by reference, several specific reaction parameters applicable to the process of the present invention are described.

With further regard to the process of the present invention, initially there is provided an acid mixture of the metallic elements, such as selenium and arsenic; and subsequently, a solution is formulated by admixing with an alcohol. After filtration, the solution filtrate is subjected to a coreduction reaction enablinga high purity selenium arsenic alloy, which is separated therefrom and identified by optical emission spectroscopy. The degree of purity of the alloy product is dependent on a number of factors including the purity of the alloy reactant. Generally however, the products are of a purity of from about 99.5 percent to about 99.99 percent.

Generally, the alcohol selected is of the formula ROH, wherein R is an alkyl group of from 1 to about 30 carbon atoms, and preferably from 1 to about 6 carbon atoms. Illustrative examples of preferred alcohols include those wherein the R group is methyl, ethyl, propyl, butyl, pentyl, hexyl, and the like, with methyl and ethyl being preferred. Specific illustrative examples of alcohols selected for the process of the present invention are methanol, ethanol, and propanol. Glycols that are useful include ethylene glycol, and propylene glycol.

The amount of alcohol or glycol used in the dissolution is dependent on a number of factors, including the reaction conditions, the composition of the acids, and the like. Generally, however, there is used for each pound of acid mixture from 800 milliliters to about 1,500 milliliters, and preferably from about 1,000 milliliters to about 1,200 milliliters of alcohol or glycol.

Subsequently, the solution is subjected to a coreduction reaction as described, for example, in U.S. Pat. No. 4,411,698, the disclosure of which has been totally incorporated herein by reference. In one embodiment, thus a chemical reducing agent, such as hydrazine, is added to the solution while heating, for example, at a temperature of from about 80° C. to about 200° C. permitting the formation of a high purity selenium arsenic alloy product.

Numerous different reducing agents can be selected for accomplishing the reduction of the acids mixture solution. Illustrative examples of chemical reducing agents include hydrazine, which is preferred, sulfur dioxide, hydroxylamine, hydroaquinone, thioureas, phosphites, formic acid, ascorbic acid, glyoxal, and the like. These reagents are added to the solution in an amount sufficient to enable a complete precipitation of the selenium alloy in high purity and in high yields, greater than 85 percent, and in some instances greater than 98 percent. The reduction reaction which is generally completed when no further nitrogen is emitted from the reaction mixture, results in a selenium alloy precipitate of a black color. Specifically, thus with hydrazine as the reducing agent, a black crystalline selenium alloy is generated. Subsequently, the high purity selenium alloy can be separated from the reaction mixture by a number of suitable known methods including filtration. Thereafter, as an optional treatment step, the separated selenium alloy can be washed with suitable solvents such as water and cellosolve, followed by drying in air. Usually, about 500 milliliters or more of washing solvent is selected for each pound of precipitated selenium alloy.

Various different acids can be selected for treatment in accordance with the process of the present invention, inclusive of acid mixtures of selenium with arsenic, tellurium, bismuth and antimony. Specific acids that can be selected are selenious acid, selenic acid, arsenious acid, arsenic acid, telluric acid, and tellurous acid. Also, there can be used as reactants the oxides of bismuth, and antimony. Further, a mixture of acids of one element and the oxides of another, such as selenium oxide, titanium oxide, antimony oxide, bismuth oxide, and arsenic oxide can be selected for the process of the present invention. The aforementioned mixtures, especially the acid mixtures, can be comprised of various amounts of selenium acid providing the objectives of the present invention are achieved, and further depending on the other reaction parameters. Generally, the solution mixture comprises from about 1 percent to about 99 percent by weight of selenium acid, and about 99 percent by weight to about 1 percent by weight of other metallic acid such as arsenic acid.

The purity of the selenium alloy formulated in accordance with the process of the present invention can be determined by optical emission spectroscopy. Also, the diameter of the alloy products are from about 1 micron to about 10 microns, and preferably from about 2 microns to about 8 microns. These particle sizes enable effective dispersion of the alloy products in polymeric resinous binders. Accordingly, the resulting small particle alloys are very useful as photogenerating layers in imaging members with aryl amine hole transport layers, reference U.S. Pat. No. 4,265,900, the disclosure of which is totally incorporated herein by reference.

More specifically, the high purity alloys obtained in accordance with the process of the present invention, including the high purity selenium arsenic alloy, comprised of, for example, about 99 percent by weight of selenium and 1 percent by weight of arsenic can be selected for use as photoconductive imaging members in electrostatographic imaging processes. These alloys generally include therein a substantial amount of selenium, about 60 percent or more, thus alloys comprised of from about 60 percent to about 99.9 percent by weight of selenium, and from about 0.5 percent to about 40 percent by weight of arsenic are envisioned. Additionally, preferred are alloys with from about 95 percent to about 99.9 percent of selenium, and from about 5 percent to about 0.5 percent by weight of arsenic. Examples of other useful alloys formulated in accordance with the process of the present invention are selenium antimony and selenium bismuth. Also, examples of layered organic photoresponsive imaging members having incorporated therein the high purity selenium alloys prepared in accordance with the process of the present invention include those comprised of photogenerating and transport layers as described in U.S. Pat. No. 4,265,990, the disclosure of which has been totally incorporated herein by reference. The following examples specifically defining preferred embodiments of the present invention are now provided. These examples are not intended to limit the scope of the present invention, it being noted that various alternative parameters which are not specifically mentioned are included within the scope of the present invention. Parts and percentages are by weight unless otherwise indicated. In the examples, the identity of the isolated alloys was determined by X-ray diffraction and X-ray Fluorecene Spectroscopy, while the purity of the products was determined by Optical Emission Spectroscopy; and the particle size diameters were determined by Transmission Electron Microscopy.

EXAMPLE I

There was prepared a bismuth selenide, $Bi_2Se_3$, alloy by initially heating to a refluxing temperature in a 1-liter round bottom 3-neck flask equipped with a reflux condenser, a dropping funnel, and a magnetic stirrer, 46.5 grams, 0.01 mole, of bismuth oxide, and 37.7 grams, 0.3 mole, of selenious acid in 100 milliliters of ethylene glycol. This mixture was permitted to reflux for 5 minutes by the dropwise addition of 30 grams of hydrazine. The reduction reaction that ensued was exothermic, and completion of the reaction was indicated by the cessation of nitrogen gas. Refluxing was continued for 1 hour, and thereafter the resulting mixture was cooled to room temperature, followed by filtration. There was generated a black precipitate, which was washed with ethylene glycol and dried yielding 63 grams of a crystalline and homogeneous alloy composition, $Bi_2Se_3$, as determined by spectroscopic analysis. The average particle diameter of this alloy was about 5 microns.

EXAMPLE II

The process of Example I was repeated with the exception that there was prepared bismuth telluride, $Bi_2Te_3$, by heating a solution of the bismuth oxide and tellurium oxide, 47.8 grams, which oxide was selected in place of the selenious acid.

A crystalline and homogeneous, $Bi_2Te_3$, alloy, 79 grams, was obtained as determined by spectroscopic methods. Additionally, the average particle diameter of the resulting alloy was about 5 microns.

EXAMPLE III

There was prepared a ternary alloy of arsenic, tellurium, and selenium by repeating the procedure of Example I with the exceptions as noted. More specifically, there was heated in the 3-neck, round bottom flask a solution of 35.5 grams of arsenic acid, 48.4 grams of selenious acid, and 3.1 grams of tellurium dioxide in 200 milliliters of ethylene glycol. There resulted 49 grams of an arsenic selenium tellurium alloy of the composition $As_{36.8}, Se_{58.2}, Te_5$, as determined by spectroscopic analysis. This alloy was crystalline and homogeneous; and further, the average particle diameter thereof was about 3 microns.

EXAMPLE IV

An arsenic triselenide alloy was prepared by repeating the procedure of Example I wherein there was heated in the round bottom flask a solution of 28.4 grams, 0.2 moles, of arsenic acid, and 38.7 grams, 0.3 moles, of selenious acid in 150 milliliters of ethylene glycol. There was obtained 36.8 grams of a homogeneous and crystalline selenium arsenic alloy, $Se_3As_2$, as determined by spectroscopic analysis. Additionally, the average particle diameter of the alloy was about 3 microns.

EXAMPLE V

An arsenic telluride alloy was prepared by repeating the procedure of Example I with the exception that there was heated in the 3-neck, round bottom flask a solution of 28.4 grams, 0.2 moles, of arsenic acid, and 48 grams, 0.3 moles, of tellurium dioxide in 150 milliliters of ethylene glycol. There was obtained 26.3 grams of a crystalline and homogeneous telluride ally composition, $As_2Te_3$, as determined by spectroscopic methods. Additionally, this alloy had an average particle diameter of 5 microns.

EXAMPLE VI

An antimony telluride alloy was prepared by repeating the procedure of Example I with the exception that there was heated in the 3-neck, round bottom flask a solution of 14.55 grams of antimony oxide, and 24 grams of tellurium dioxide in 150 milliliters of ethylene glycol. Also, in place of the 30 grams of hydrazine, there was added instead 20 grams of hydrazine. There results 31.1 grams of homogeneous and crystalline antimony tellurium alloy composition, $Sb_2Te_3$, as determined by spectroscopic methods. This alloy had an average particle diameter of 6 microns.

EXAMPLE VII

There was prepared an antimony selenide by repeating the procedure of Example I wherein there was heated in the 3-neck, round bottom flask a solution of 11.68 grams of antimony oxide, and 15.48 grams of selenious acid in 50 milliliters of ethylene glycol. Also, there was added to the solution 15 grams of hydrazine instead of 30 grams of hydrazine. Further, heating was continued for 30 minutes after refluxing instead of 1 hour. These results 16.3 grams of a homogeneous and crystalline antimony tellurium alloy composition, $Sb_2Se_3$, as determined by spectroscopic methods. Further, this alloy had an average particle diameter of 24 microns.

Other modifications of the present invention will occur to those skilled in the art based upon a reading of the disclosure of the present application, and these modifications are intended to be included within the scope of the present invention.

What is claimed is:

1. A process for the preparation of high purity chalcogenide alloys which comprises providing an acid mixture of chalcogens; forming a solution thereof; and thereafter reacting the solution with a reducing agent.

2. A process in accordance with claim 1 wherein the mixture is comprised of selenious acid and arsenic acid.

3. A process in accordance with claim 1 wherein the solution is formulated with an alcohol, or a glycol.

4. A process in accordance with claim 3 wherein methanol, ethylene glycol or propylene glycol is selected.

5. A process for the preparation of high purity selenium alloys which comprises converting an acid mixture of selenium and other metallic elements to a solution by treatment with an alcohol or glycol; followed by admixing with a reducing agent; and thereafter separating the selenium alloy products therefrom.

6. A process in accordance with claim 5 wherein the diameter of the particles is from about 1 micron to about 10 microns.

7. A process in accordance with claim 5 wherein the reducing agent is hydrazine.

8. A process in accordance with claim 5 wherein the reduction reaction is accomplished at a temperature of from about 25° C. to about 100° C.

9. A process for the preparation of a selenium arsenic alloy which comprises providing an acid mixture of selenium and arsenic; converting the mixture into a solution; admixing with a reducing agent; and thereafter separating the selenium arsenic alloy product therefrom.

10. A process in accordance with claim 9 wherein the reducing agent is hydrazine, and there results a selenium arsenic alloy.

11. A process in accordance with claim 9 wherein the reduction reaction is accomplished at a temperature of from about 25° C. to about 200° C.

12. A process in accordance with claim 9 wherein the solution is formed by treatment with an alcohol or a glycol.

13. A process for the preparation of a selenium tellurium alloy which comprises providing an acid mixture of selenium and tellurium; converting the mixture into a solution; reacting the solution with a reducing agent; and thereafter separating the selenium tellurium alloy product therefrom.

14. A process for the preparation of a selenium tellurium alloy of the formula $Se_2Te_3$ which comprises providing an acid mixture of the acids of selenium and tellurium; converting the mixture into a solution with an alcohol or a glycol; reacting the solution with hydrazine; and thereafter separating the selenium tellurium alloy product therefrom.

15. A process for the preparation of a selenium antimony alloy which comprises providing an acid mixture of the acids of selenium and tellurium; converting the mixture into a solution; reacting the solution with a reducing agent; and thereafter separating the selenium tellurium alloy product therefrom.

16. A process in accordance with claim 15 wherein the reducing agent is hydrazine, and there results a selenium antimony alloy of the formula $Se_2Sb_3$.

17. A process for the preparation of a selenium bismuth alloy which comprises providing an acid mixture of the acid of selenium and bismuth oxide; converting the mixture into solution; reacting the solution with a reducing agent; and thereafter separating the selenium bismuth alloy product therefrom.

18. A process in accordance with claim 17 wherein the reducing agent is hydrazine, and there results a selenium bismuth alloy of the formula $Bi_2Se_3$.

19. A process for the preparation of an arsenic tellurium alloy which comprises providing a mixture of the acid of arsenic and tellurium oxide; converting the mixture into solution; reacting the solution with a reducing agent; and thereafter separating the alloy product therefrom.

20. A process in accordance wtih claim 19 wherein the reducing agent is hydrazine, and there results an arsenic tellurium alloy.

21. A process in accordance with claim 19 wherein a glycol or alcohol is selected for converting the mixture into a solution.

22. A process for the preparation of a bismuth tellurium alloy which comprises providing a mixture of the acid of bismuth and tellurium oxide; converting the mixture into solution; reacting the solution with a reducing agent; and thereafter separating the alloy product therefrom.

23. A process in accordance with claim 22 wherein the reducing agent is hydrazine, and there results a bismuth tellurium alloy.

24. A process in accordance with claim 22 wherein a glycol or alcohol is selected for converting the mixture into a solution.

25. A process for the preparation of an antimony tellurium alloy which comprises providing a mixture of the acid of antimony and tellurium oxide; converting the mixture into solution; reacting the solution with a reducing agent; and thereafter separating the alloy product therefrom.

26. A process in accordance with claim 25 wherein the reducing agent is hydrazine, and there results a bismuth tellurium alloy.

27. A process in accordance with claim 25 wherein glycol or alcohol is selected from converting the mixture into a solution.

28. A process for the preparation of high purity ternary alloys which comprises providing a mixture of selenious acid, arsenic acid, and tellurium oxide; forming a solution thereof; and thereafter reacting the solution with a reducing agent, and separating the alloy powder product therefrom.

29. A process in accordance with claim 28 wherein the alloy is of the composition $As_{36.8}$, $Se_{58.2}$, and $Te_5$.

30. A process in accordance with claim 28 wherein the reducing agent is hydrazine.

* * * * *